US006482285B2

(12) United States Patent
Cross

(10) Patent No.: US 6,482,285 B2
(45) Date of Patent: Nov. 19, 2002

(54) METHOD OF CREATING A TRANSFER

(75) Inventor: Kyle G. Cross, Hagerstown, IN (US)

(73) Assignee: Stahls' Inc., St. Clair Shores, MI (US)

( * ) Notice: Subject to any disclaimer, the term of this patent is extended or adjusted under 35 U.S.C. 154(b) by 0 days.

(21) Appl. No.: 09/775,768

(22) Filed: Feb. 2, 2001

(65) Prior Publication Data

US 2001/0025687 A1 Oct. 4, 2001

Related U.S. Application Data

(63) Continuation-in-part of application No. 09/009,558, filed on Jan. 20, 1998, now abandoned.

(51) Int. Cl.[7] .......................... B44C 1/165; B44C 1/17; B32B 31/20; C09J 5/06; B41M 3/12

(52) U.S. Cl. ...................... 156/230; 156/234; 156/240; 156/247; 156/277; 156/289; 156/248; 156/268; 427/146; 427/147; 427/148; 428/40.1; 428/42.1; 428/343; 428/347; 428/352; 428/914

(58) Field of Search .......................... 156/64, 230, 234, 156/240, 241, 247, 277, 289, 250, 268, 248, 249; 428/40.1, 346, 914, 42.1, 343, 347, 352; 427/146, 147, 148

(56) References Cited

U.S. PATENT DOCUMENTS

| | | | |
|---|---|---|---|
| 3,660,212 | A | 5/1972 | Liebe, Jr. |
| 3,922,435 | A | 11/1975 | Asnes |
| 4,035,532 | A | 7/1977 | Gregorian et al. |
| 4,292,100 | A | 9/1981 | Higashiguchi |
| 4,294,641 | A | 10/1981 | Reed et al. |
| 4,314,813 | A | 2/1982 | Masaki |
| 4,340,632 | A | 7/1982 | Wells et al. |
| 4,423,106 | A | 12/1983 | Mahn |
| 4,482,598 | A | 11/1984 | Ishii et al. |
| 4,640,727 | A | 2/1987 | Janssen |
| 4,652,478 | A | 3/1987 | Maii |
| 4,704,310 | A | 11/1987 | Tighe et al. |
| 4,731,149 | A | 3/1988 | Dowzall et al. |
| 4,735,854 | A | 4/1988 | Lauchenauer |
| 4,786,349 | A | 11/1988 | Mahn, Sr. |
| 4,810,549 | A | 3/1989 | Abrams et al. |
| 4,869,957 | A | 9/1989 | Vankerckhoven et al. |
| 4,902,364 | A | 2/1990 | Parker et al. |
| 4,927,682 | A | 5/1990 | Nagura et al. |
| 5,021,275 | A | 6/1991 | Kim |
| 5,026,584 | A | 6/1991 | Logan |
| 5,047,103 | A | 9/1991 | Abrams et al. |
| 5,073,423 | A | 12/1991 | Johnson et al. |
| 5,098,772 | A | 3/1992 | af Strom |
| 5,112,423 | A | 5/1992 | Liebe, Jr. |

(List continued on next page.)

OTHER PUBLICATIONS

Temin, S.C., "Pressure–sensitive Adhesives for Tapes and Labels", 1990, Handbook of Adhesives, 3rd. Edition, Skeist, ed., pp. 643–644.*

*Primary Examiner*—J. A. Lorengo
(74) *Attorney, Agent, or Firm*—Brooks & Kushman P.C.

(57) ABSTRACT

The present invention involves a method of creating a transfer. The method comprises providing a heat sensitive polymer substrate having a heat sensitive opaque polymer film and a heat activated adhesive disposed thereon, and providing a second carrier film having a second polymer film and a second adhesive wherein the second adhesive has a peel strength which decreases with increasing temperature. The method further includes printing resin solids in a desired graphic onto the opaque polymer film at a temperature which is below the temperature at which the polymer substrate is activated to create a printed transfer, positioning the printed transfer on the second polymer film, and adhering the printed transfer onto an adherable article by applying sufficient heat to the polymer substrate at a temperature which is above the temperature which the polymer substrate activates and at which to substantially reduce the peel strength of the second adhesive.

22 Claims, 3 Drawing Sheets

U.S. PATENT DOCUMENTS

| | | | | | |
|---|---|---|---|---|---|
| 5,143,672 | A | | 9/1992 | Kuwahara | |
| 5,149,388 | A | | 9/1992 | Stahl | |
| 5,167,750 | A | | 12/1992 | Myers | |
| 5,196,080 | A | | 3/1993 | Mizobuchi et al. | |
| 5,200,268 | A | | 4/1993 | Hamada | |
| 5,207,851 | A | | 5/1993 | Abrams | |
| 5,302,223 | A | | 4/1994 | Hale | |
| 5,312,645 | A | | 5/1994 | Dressler | |
| 5,431,501 | A | | 7/1995 | Hale et al. | |
| 5,525,403 | A | | 6/1996 | Kawabata et al. | |
| 5,537,135 | A | * | 7/1996 | Hevenor et al. | 347/171 |
| 5,569,347 | A | | 10/1996 | Obata et al. | |
| 5,575,877 | A | | 11/1996 | Hale et al. | |
| 5,597,641 | A | | 1/1997 | Suematsu et al. | |
| 5,598,202 | A | * | 1/1997 | Peterson | 367/213 |
| 5,612,140 | A | | 3/1997 | Sogabe | |
| 5,658,667 | A | | 8/1997 | Yoshida et al. | |
| 5,932,352 | A | * | 8/1999 | Higgins | 428/423.1 |
| 6,106,645 | A | * | 8/2000 | Stempien | 156/64 |

* cited by examiner

METHOD OF CREATING A TRANSFER

CROSS-REFERENCE TO RELATED APPLICATIONS

This application is a cip of U.S. application Ser. No. 09/009,558 filed Jan. 20, 1998, now abandoned, the disclosure of which is hereby incorporated by reference.

This application is related to U.S. application Ser. No. 08/847,414, filed Apr. 24, 1997, the disclosure of which is hereby incorporated by reference.

BACKGROUND OF THE INVENTION

1. Field of the Invention

The present invention relates to a method of creating an instant transfer that can be applied to a dark substrate. The transfer of the present invention is formed on an opaque substrate which is produced and a carrier film on which the transfer is positioned to adhere the transfer onto an article.

2. Background Art

Instant transfers have widely been utilized to facilitate rapid printing of images on a desired substrate. For example, instant transfers have been used to provide full color graphics which can then be transferred onto shirts, caps, jackets, mugs, plaques and other custom printed items in a matter of minutes. With the assistance of instant transfer printers, and computer technology, logos and photographs can readily be converted into instant transfers for application onto a variety of desired surfaces. While many different instant transfers have been developed, sublimation transfer is probably the most popular form of instant transfer used in today's market.

Sublimation transfers create a color image on a fabric or hard surface by actually dyeing the fabric or surface. When a sublimation transfer is heat applied, the heat and pressure cause the sublimation dye to change from a solid directly into a gas and enter the substrate. While in its gaseous form, the sublimation dye actually enters the fibers of the desired garment or the coating of a non-porous object, thereby dyeing the item. Since the sublimation dye in this case actually penetrates either the fibers or the coating of the underlying substrate, the image created is essentially permanent and substantially non-destructible. Sublimation transfers also produce bright colors and are highly durable, as has been proven based on their ability to withstand repeated industrial laundering processes.

Within the category of sublimation transfers, there are several more specific sublimation sub-categories. Among these sub-categories, the two most commonly used are full color true sublimation and full color dye-sublimation. Between the two sublimation techniques, full color true sublimation produces the most vibrant colors. A true sublimation ribbon contains dyes for three colors-cyan, magenta and yellow, which are used to create all of the colors of the transfer. The correct amount of each color is then thermally applied from the sublimation ribbon to the backing material, and the transfer emerges from the printer as one multi-color graphic, ready for application. In contrast, with full color dye-sublimation, the dye is sublimated onto a transfer paper, after which the dye migrates to the substrate during application. Such applications are highly beneficial for non-porous, hard objects, such as mugs and trophies, due to the high pressure required for application. With applications on soft items, such as shirts and caps, a transfer using full color dye-sublimation usually results in faded colors. Dye sublimated images, especially photographs, are particularly sharp versus their counterpart true sublimation image.

With dye sublimation, the ribbon actually sublimates the carrier sheet as it runs through the printer and the ultimate graphic must then be re-sublimated on the final substrate. This is, accordingly, considered a second-generation sublimation process. True sublimation uses a combination of heat and pressure from the thermal printing head, by which the dye has been transferred to a special carrier sheet. With the use of this special carrier sheet, the sublimation particles do not sublimate during printing. When heat is applied to transfer the image onto an item, the dye on the carrier sheet sublimates to the substrate. This is considered a first generation sublimation process.

While sublimation transfers produce brighter colors and constitute a substantially permanent and indestructible transfer, sublimation processes offer the best results on white or light-color fabrics with a high polyester content. Other final substrates, such as ceramics, glass, metals and plastics which are pre-treated with a polymer coating, also constitute good final substrates for sublimation transfers.

Notwithstanding the advantages of sublimation transfers, there exist several limitations. Sublimation transfers cannot be applied to such final substrates as 50—50 polyester cotton blends or non-polyester fabrics, but rather the non-polyester fabric must be sprayed or soaked with a special polyester-based prepping liquid to facilitate sublimation transfer. Sublimation transfers applied on a 100% cotton final substrate may result in a sublimation image lacking vibrant colors. With porous substrates, the colors of the sublimated image may not appear as vibrant as desired. In addition, sublimation transfers are not detectable on dark surfaces. Since it is impossible to create a white sublimation dye, and since other sublimation dyes are absorbed into the dark background, it is impossible to see a sublimated image on a dark final substrate. There has thus been no efficient, durable and effective process for creating an instant transfer on a dark surface. Accordingly, there is a need for a method of creating an instant transfer on porous final substrates, wherein the resultant transfer is vibrant, durable and can be efficiently produced.

There exists yet another kind of instant transfer, referred to as a "wax" transfer. With this transfer technique, the color image is printed onto a polymer coated paper. With the use of a high temperature application process, the polymer coating "melts" onto the substrate. However, with such wax transfers, the polymer coating creates a non-desirable polymer border around the polymer transfer which has a different appearance and texture than the desired transfer. Accordingly, such wax transfer technology is generally undesirable.

With the above-identified instant transfer technologies, the transfers are created on a carrier medium, which is in turn utilized to re-transfer that carrier medium to a final substrate. For example, with the sublimation transfer process, the desired image is transferred onto a carrier medium such as paper, which is then in turn heat applied to a final substrate. As a result, with a sublimation transfer or a wax transfer, there is often a color shift which occurs following the dual transfers that are required to create a transfer on the final substrate. To remedy such color shifting problems, computer technology is often utilized to pre-shift the color changes so that the resulting transfer creates the desired image. However, slight changes in the surface characteristics of the final substrate or the process parameters alters the resulting color which makes it impossible to accurately pre-shift. Such problems associated with color shifting create additional software and programming issues which effect predictability and reproduceability of the process.

As a result, there is a need for a transfer process which can be utilized with a variety of final substrates, including porous and non-porous materials, as well as dark colored substrates. Moreover, there is a need for an efficient transfer process which creates a transfer without the associative color shifting problems and durability concerns.

SUMMARY OF THE INVENTION

It is an object of the present invention to provide a method of creating a transfer. The method comprises providing a heat sensitive polymer substrate having a heat sensitive opaque polymer film with top and bottom surfaces and a heat activated adhesive disposed upon one surface of the heat sensitive opaque polymer film. The method further includes providing a second carrier film including a second polymer film with first and second opposite surfaces and a second adhesive having a peel strength which decreases with increasing temperature. The second adhesive is disposed on the first surface of the second film. The method further includes printing resin solids in a desired graphic onto the top surface of the opaque polymer film. The printing is at a temperature which is below the temperature at which the polymer substrate is activated and such that printing causes the resin solids to penetrate into the opaque polymer film to create a durable printed transfer. The method further includes positioning the printed transfer on the first surface of the second film and adhering the printed surface onto a thermally adherable article on which the graphic is to appear. This is accomplished by applying sufficient heat to the polymer substrate at a temperature which is above the temperature which the polymer substrate activates so as to activate the polymer substrate and bond the polymer substrate to the article. The heat is also at a temperature at which substantially reduces the peel strength of the second adhesive.

Another embodiment of the present invention is to provide a method of creating a transfer. The method comprises providing a heat sensitive polymer substrate having a heat sensitive opaque polymer film having top and bottom surfaces, a heat activated adhesive disposed upon one surface of the heat sensitive opaque polymer film, and a releasably coated carrier film which releasably carries the heat sensitive opaque polymer film with the heat activated adhesive disposed between the heat sensitive opaque polymer film and the releasably coated carrier film. The method further comprises providing a second carrier film including a second polymer film having first and second opposite surfaces and a second adhesive having a peel strength which decreases with increasing temperature. The second adhesive is disposed on the first surface of the second film. The method further comprises printing resin solids in a desired graphic onto the top surface of the opaque polymer film. The printing is at a temperature which is below the temperature at which the polymer substrate is activated and such that printing causes the resin solids to penetrate into the opaque polymer film to create a durable printed transfer. The method further comprises positioning the printed transfer on the first surface of the second film and adhering the printed transfer onto a thermally adherable article on which the graphic is to appear by applying sufficient heat to the polymer substrate at a temperature which is above the temperature which the polymer substrate activates so as to activate the polymer substrate and bond the polymer substrate to the article and at which to substantially reduce the peel strength of the second adhesive, and by applying sufficient force to adhere the graphic to the article.

DETAILED DESCRIPTION OF THE PREFERRED EMBODIMENTS

With the present invention, a multi-color transfer can be created with the use of an opaque substrate on which the transfer can be produced and a second carrier film on which the transfer can be positioned to adhere the transfer onto an article. With this technology, an instant transfer can be created which is more durable than screen printing or other ways of printing an image on a substrate.

The invention further allows an image to be printed and almost simultaneously cut into the desired transfer configuration. This process produces a transfer similar to a die-cut product. Previously, to create a "die-cut product," a die would have to be formed in the desired transfer shape. With this invention, a transfer can be cut into the desired shape immediately following printing without the need for any additional tooling, or the need for die formation.

Figure 1:
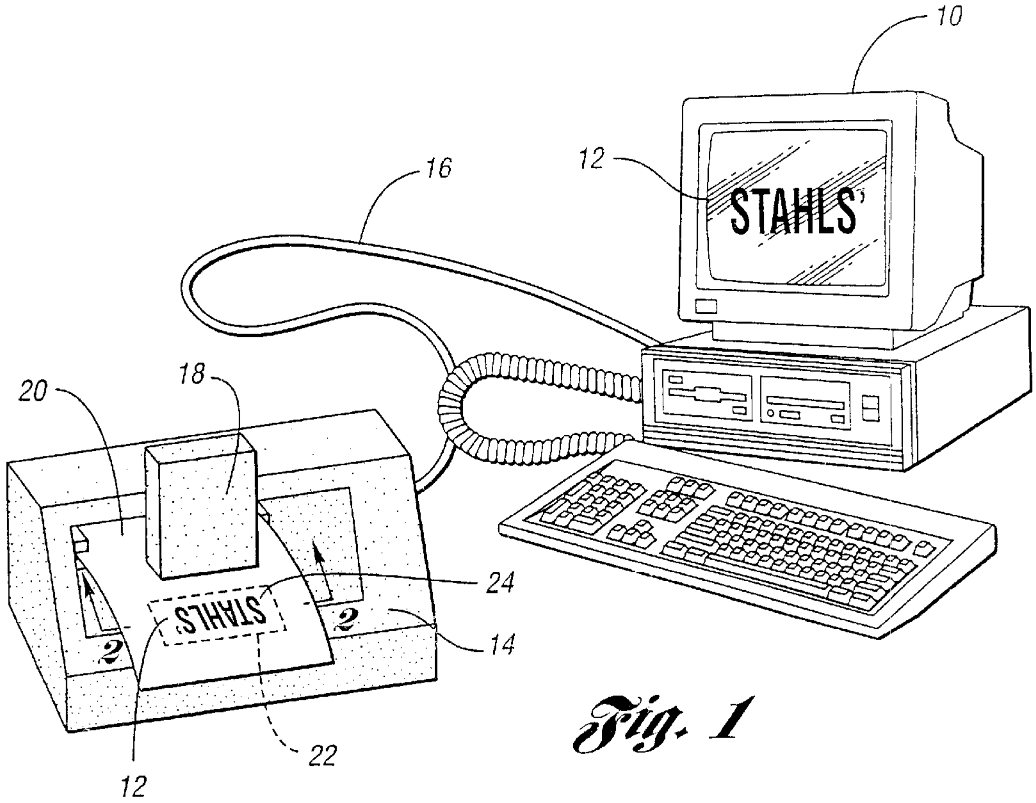
FIG. 1 is a view illustrating the printing of a thermal transfer onto a desired article employing a printer connected to a computer containing a computer-readable file corresponding to a printed graphic.

With reference to FIG. 1, a computer-readable file in computer 10 corresponds to the desired graphic 12 and is communicated to printer 14 over cable 16. Printer 14 is a thermal printer preferably having a resin ribbon cartridge 18. In the preferred embodiment, the polymer substrate 20 contains either a polyurethane film or a PVC-based polyurethane film. As further depicted in FIG. 1, the polymer substrate 20 is fed into the thermal printer 14 on which the desired graphic 12 is thermally printed thereon. A thermal printer which will print in what is known as "four pass" (color) or "three pass" (color) with multiple color capability are examples of computer driven printers which may be used in conjunction with this process.

In general, thermal printers operate with a thermal printer ribbon which is taken from a roll past the platen and printhead on a 2-way take-up roll. For most full color thermal printers, the use of cyan, yellow, magenta and black panels on the printer ribbon allows the printer to print in full color or multi-color graphics.

The computer 10 directs a printer 14 to print the desired graphic 12 onto the polymer substrate 20. Any means of inputting a graphic into a computer may be used, including graphics generated by software. Available computer design graphic software may be used, or the graphic may be photographic, or simply letters or words.

In the preferred embodiment, the thermal printer uses a ribbon substrate generally composed of plastic or a polyester ribbon and a heat-meltable ink layer provided on the ribbon substrate. In the preferred embodiment, a ribbon as disclosed in the 5,612,140 patent assigned to Fujicopian Co., Ltd. is used in conjunction with a thermal printer. As disclosed in the '140 patent, it is believed that this heat-meltable ink layer is melt-transferred by selectively heating the ink layer from the back side of the substrate by means of a thermal head.

In the preferred embodiment, multi-color images are developed by virtue of subtractive color mixture of at least two superimposed inks of yellow, magenta and cyan. For example, a region in the substrate where the yellow ink and the magenta ink are present develops a red color; a region where the yellow ink and the cyan ink are present develops a green color and the like. Gradation (half-tone colors) for each color can be obtained by controlling the amount of each color ink transferred so that the amount of each color ink entering the substrate is adjusted.

The heat-meltable ink layers for respective colors used in the preferred embodiment of the present invention are each composed of a coloring agent and a heat-meltable vehicle which is composed predominantly of a wax and optionally a heat-meltable resin.

Examples of specific waxes which can be used in the heat-meltable ink layers include natural waxes such as haze wax, bees wax, lanolin, carnauba wax, candelilla wax, montan wax, ceresine wax, petroleum waxes such as paraffin wax and microcrystalline wax, synthetic waxes such as oxidized wax, ester wax, low molecular weight polyethylene wax, urethane wax and fischer-tropsch wax; higher fatty acids such as lauric acid, myristic acid, palmitic acid, stearic acid and behenic acid; higher aliphatic alcohol such as stearyl alcohol and docosanol; esters such as higher fatty acid monoglycerides, succrous fatty acid esters and sorbitan fatty acid esters; and amides and besamides such as oleic acid, amide. These waxes may be used either alone or in combination.

The coloring agents for yellow, magenta and cyan for the ink layers are preferably transparent ones. The term "transparent pigment" is herein defined to include a pigment which gives a transparent ink when disbursed in a transparent vehicle.

With the use of a thermal transfer printer, the yellow ink layer, the magenta ink layer and the cyan ink layer are selectively melt-transferred onto the polymer substrate in a predetermined order according to separation of color signals in an original color image as set forth by the computer-readable file. When the full-color or multi-color image is formed, all three color ink layers are selectively transferred according to three color signals to form three separate color images superimposed one on top of another.

In the preferred embodiment, the computer-readable file stores data defining the graphic image to be generated, as well as the peripheral edges of the graphic image to define the cutting parameters. Accordingly, the computer-readable file includes data such that the thermal printer can print material on the polymer substrate in positional relationship to the peripheral edges of the graphic image. Preferably, the thermal printer also includes cutting means which when connected with the computer-readable file can cut the polymer substrate along the peripheral edges of the graphic image.

In the preferred embodiment, the thermal printer containing a resin ribbon is a thermal printer which includes an interchangeable cutter such that the printer can cut around the graphic to create a die-cut product. Examples of such thermal printers are the Color Cam by Roland and Digital's thermal printers. In addition, the Fargo PIC2 or 310S printers have the capability of printing resins on a substrate, without the associated die-cut capabilities.

To create the graphic image of the letters "STAHLS" in FIG. 1, the outline and colors of the graphic image are printed by the printer 14 on a heat sensitive opaque polymer film 24 of the polymer substrate 20. The printer prints the outline of the letters in the colors as defined by the user. The polymer substrate 20 is then cut along the peripheral edges 22 of the graphic design. Accordingly, with the use of a multi-function thermal printer, both printing and cutting of the transfer can be achieved in one coordinated operation. Accordingly, with the use of a multi-function thermal printer, both printing and cutting of the transfer can be achieved in one coordinated operation.

Figure 2:
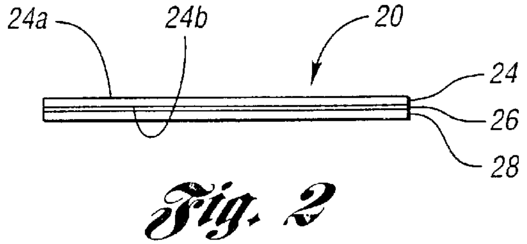
FIG. 2 is a cross-sectional view of a multi-layer substrate sheet depicted in FIG. 1 taken along line 2—2 and illustrating the composition of the substrate for use in conjunction with a method of the present invention.

FIG. 2 illustrates a cross-section of a heat sensitive polymer substrate 20, taken along lines 2—2 of FIG. 1, to illustrate the multi-layer composition. The heat sensitive polymer film 24 is preferably composed of polyurethane or polyvinyl chloride. The opaque polymer film 24 has top and bottom surfaces 24*a*, 24*b*, respectively. In addition to the heat sensitive opaque polymer film 24, the substrate 20 includes, in mating engagement with the polymer film 24, a heat activated adhesive layer 26 on the bottom surface 24*b* and a releasably coated carrier film 28. The releasably coated carrier film 28 releasably carries the heat activated adhesive layer 26.

Preferably, heat activated adhesive layer 26 is composed of a polyester adhesive. The adhesive layer 26 must have sufficient tackiness to hold together the polymer film 24 and the releasably coated carrier film 28 during the printing and cutting process. The adhesive layer 26 is preferably composed of one or more heat activatable adhesives, such as hot melt thermoplastics and B-staged thermosets, for adhesion to an article, as described below. The carrier 28 is preferably composed of mylar, paper, polyester, or PVC. Carrier 28 may also comprise a coating containing a release agent made of wax, silicon resin, or mixtures thereof.

In the preferred embodiment, the ribbon cartridge 18 includes a thermal print head with a plurality of heating elements distributed along the head. In the preferred embodiment, the thermal printer is a single machine which serves multi-functions through the use of interchangeable printing and cutting heads to carry out the two separable functions.

Accordingly, under a process for transfer printing of a computer-readable graphic to an article, the first step involves providing a computer-readable file corresponding to the desired graphic. The next step is imprinting the computer-readable file to a thermal printer, wherein the thermal printer contains a resin ribbon. The graphic is next printed by the thermal printer onto a polymer substrate to form a transfer, wherein the polymer substrate is selected to allow resins from the resin ribbon to penetrate therethrough. Under this invention, the computer-readable file generated corresponds to the graphic. In the preferred embodiment, the thermal printer utilizes four ink color cartridges in the following colors: cyan, magenta, yellow and black. Each of the ink cartridges holds a transparent ink of a specific color. During printing, the thermal printer successively prints that portion of the graphic utilizing each color one after the other, in right-reading form. Accordingly, as compared to all previous instant transfer technology, the method does not require reverse printing on a substrate or complicated software designed to compensate for color shifting in a second generation transfer process. Under this method, the printing is done directly by the thermal printer onto the selected substrate which is then itself heat applied to a desired article. Under this invention, the transfer is created during the printing step itself, rather than following heat application.

Examples of resins which can be used in conjunction with the resin ribbons of the thermal printer includes EVA, EEA, polyethylene, polystyrene, polypropylene, polybutene, polypentene, petroleum resins, vinyl chloride resins, polyvinyl alcohol, vinylidene chloride resins, methacrylic resins, polyamide, polycarbonate, phlorene resins, polyvinyl formal, polyvinyl butyral, acetyl cellulose, nitrocellulose, vinyl acetate resins, polyisobutylene, and polyacetal. Copolymer resins may also be used comprising ethylone, propylene, butene, or pentene.

In the preferred embodiment, polyurethane resins and polyamide resins are used for the resin ribbon since they exhibit a good adhesion especially to a polyester fabric. In the preferred embodiment, the resin ribbon comprises a heat-meltable transparent ink layer and a heat-meltable vehicle.

While not wishing to be bound to any particular theory it is believed that the step of heat sealing the transfer to an article causes the transferred resins on the polymer substrate to penetrate further therein. This thereby may explain the increased durability of the resulting transfer.

For testing purposes, applied transfers from this invention's process as well as applied sublimation transfers were tested under industry recognized washability standards. The applied transfers were washed 10 consecutive times under industrial laundering conditions. In a side-by-side comparison, the applied transfers created under this process retained their vibrant colors, with little to no fading just as the permanent applied sublimation transfers. In contrast, the wax transfers, after 10 cycles experienced fading and fraying.

Since the substrate used in this invention is a light opaque substrate, the application of successive transparent colored inks produces a vibrant color with no associated color shift. The colors programmed into the computer-readable file result in a transfer having the same colors in the same desired graphic. Moreover, the use of a light, opaque substrate facilitates application of these transfers onto dark-colored articles, a feat which the prior art could not accomplish. The polymer substrates used for the transfers are further conducive to application onto a variety of fabric articles. The transfers of this invention can be applied to 100% cotton, mixed cotton-polymer blends, nylon, as well as burlap, polyester, wool, acetate, rayon, jute and the like. Unlike sublimation transfers, which have restricted application to fabrics having a significant polyester content, transfers under this method have a wide range of fabrics for use in conjunction therewith.

Under this invention, a computer-readable file can be created in the form of the graphic and in the form of an outline or desired cutting pattern. New printer technology combines thermal printing capabilities with cutting capabilities. These new printers can thus be utilized in the field of transfer technology to provide one-shot transfer printing and cutting. These printers first imprint the graphic on the substrate and then score the opaque polymer film and the heat activated adhesive in the desired cutting pattern to create a predetermined outline around the graphic to facilitate kiss cutting and/or to facilitate separation of a printed transfer from a releasably coated carrier film. The opaque polymer film is kiss cut to form the printed transfer such that the depth of the kiss cut extends through the adhesive layer and the opaque polymer film, but not completely through the releasably coated carrier. Following the printing and cutting, the transfer simply needs to be weeded or removed from the releasable layer and adhered to a second carrier, as described below, and heat applied to an article. The ability to both print and cut a transfer with a printer, significantly reduces the cost associated with molding a die and then the labor associated with die-cutting. With the new printer technology, coupled with the polymer substrate of the present invention, a transfer can be printed and cut by one machine in a simple and cost-effective manner.

After the printer has cut an outline of the desired decorative graphic, portions of polymer film 24 which are in the spaces surrounding the outline are removed or "weeded out." Portions which are outside the outline formed by the cuts will be removed or weeded out.

Figure 3:
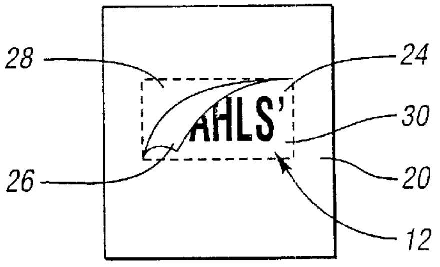
FIG. 3 is a view illustrating a process of weeding a printed transfer from a first carrier.

As depicted in FIG. 3, following printing and cutting of the graphic image and weeding of portions surrounding the outline, the graphic is weeded or separated from the remainder of the polymer substrate 20 within or around the graphic 12 to create the transfer 30. The transfer 30 includes the heat sensitive opaque polymer film 24 and the heat activated adhesive layer 26.

Figure 4:
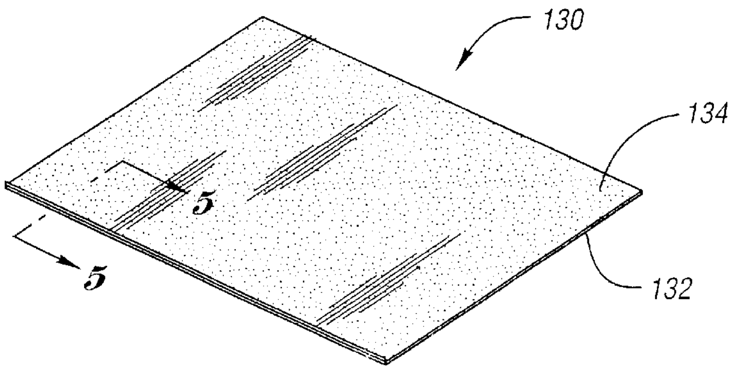
FIG. 4 is a perspective view of a second carrier used in the process of weeding the printed transfer from the first carrier.
Figure 5:
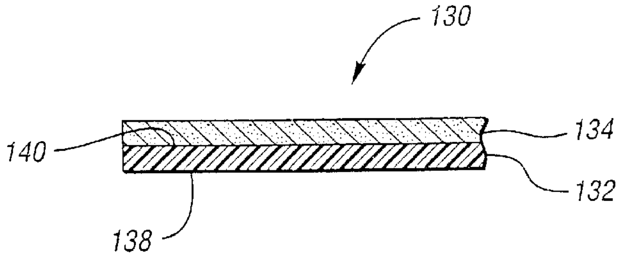
FIG. 5 is a cross-sectional view taken along line 5—5 of FIG. 4.
Figure 6:
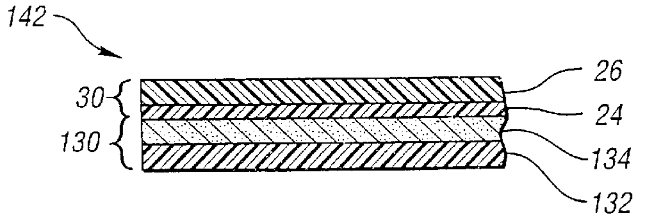
FIG. 6 is a cross-sectional view of a laminated web after adhering the printed transfer from the first carrier onto the second carrier.

Subsequently, the transfer 30 is placed face down on a second carrier film 130, with film 24 in contact with carrier 130, to provide a laminated web 142. A perspective view of the second carrier 130 is shown in FIG. 4 and a cross-sectional view of the second carrier 130 is shown in FIG. 5. FIG. 6 shows a cross-sectional view of the laminated web 142 after adhering the transfer 30 to the second carrier 130.

Turning now to FIGS. 4 and 5, the second carrier film 130 of the invention is illustrated. As indicated in FIG. 5, the carrier 130 is comprised of a substantially transparent plastic film or a second polymer film 132 and a layer of a carrier adhesive or a second adhesive 134. Second polymer film 132 has opposite surfaces 138, 140, respectively. Second adhesive 134 adheres to the transfer 30 and has a peel strength, or tackiness, which decreases with increasing temperature. The transparency of plastic film 132 is not significantly reduced by the layer of carrier adhesive thereon. Thus, the carrier 130 is itself substantially transparent.

Transparent plastic film 132 should have a melting temperature of 400° F. or more so as to withstand all processing temperatures likely to be encountered. The plastic film may be in the form of a sheet or a roll. Preferably, the plastic film 132 will be comprised of a polyester film and most preferably will be comprised of a transparent, heat stabilized polyester film commercially available as MYLAR®[1] or MELINEX®[2]. The plastic film 132 will generally have a thickness of from 1 to 10 mils. More preferably, the plastic film 132 will have a thickness of about 3 to 7 mils and most preferably will have a thickness of about 5 mils.

1 MYLAR® is a trademark of the Dupont Corporation of Wilmington, Del.
2 MELINEX® is a trademark of ICI Corporation of Wilmington, Del.

Adhesive 134 will be positioned on side or surface 140 of the second polymer film 132. Side 140 is the first surface of second polymer film 132. Side or surface 138 is the second surface of second polymer film 132 opposite from side 140 and may be described as the front or upper surface of the carrier 130. Most preferably, carrier adhesive 134 will be a substantially contiguous layer positioned so as to lay on and be contiguous with side 140 of second polymer film 132.

Adhesive 134 will generally have a tackiness or stickiness such that at room temperature, the measurable peel strength of the carrier 130 will be from 4 to 20 ounces per square inch of width as measured by the ASTM D-903 or PSTC-1 180° peel adhesion tests. The peel strength at room temperature will generally be from 8 to 20 for "high tack" carriers and from 4 to 8 ounces per square inch for "low tack carriers. High tack carriers will be utilized with graphic materials which are more difficult to bond securely. Most preferably, the peel value will be about 4 to 8 ounces per square inch.

With the application of sufficient heat to the carrier 130 to cause the adhesive 134 to reach temperatures of 200° F. or more, the measurable peel strength will decrease to a point which is substantially negligible, i.e., less than 1.0 ounce per square inch as measured by the foregoing tests. Temperatures of from 300 to 350° F. are most preferred. As a result, assuming that said heat is applied during a graphic adherence process, the carrier 130 will be capable of immediate removal from the transfer 30. In addition, the reduced peel strength will allow said immediate removal to occur with a minimum amount of upwardly applied force. As a consequence the immediate removal of the carrier will not damage the just applied graphic. Those skilled in the art will appreciate that some just applied graphics may be vulnerable to damage or distortion as a result of upwardly directed ripping or pulling forces.

Although other adhesives may be suitable, particularly desirable carrier adhesives has been achieved with the use of an acrylic/isocyanate adhesive. In general, it has been found that the isocyanate concentration appears to control the peel strength of the carrier adhesive at room temperature.

Illustrative examples of suitable acrylic resins are those commercially available from Avery Dennison Chemical Division of Millhall, Pa. as specialty pressure sensitive acrylic solution adhesives for removable applications having the code numbers AS-2401 and AS-2402. Such acrylic resin solutions may have a total solids ranging from approximately 30 to 70% non-volatile and most preferably from 40 to 60% non-volatile. Viscosities of between 10,000 to 20,000 cps and a weight per gallon of from 7.0 to 7.5 pounds per gallon are characteristic of these materials. Of these materials, AS-2402 is most preferred for use in preparing the carrier adhesive 34.

Sufficient isocyanate resin will be added to the acrylic solution so as to achieve the desired reversible tackiness quality of the carrier adhesive 134. Illustrative of a suitable isocyanate is Papi (R) 27 Polymeric MDI available from Dow Chemical Company of Midland, Mich. While other isocyanates may be suitable in the instant invention, this particular isocyanate is most preferred. It has about 40 to 50% of diphenylmethane diisocyantate containing methylene biphanyl isocyanate and from 50 to 60% polymethylene polyphenyl isocyanate.

Desirable strengths are generally achieved with the incorporation of less than 1.0% isocyanate resin on total acrylic solids. Such a composition will provide a carrier adhesive 134 having a peel strength of 4 to 20 ounces per square inch at room temperature and a peel strength of less than 3 ounces per square inch at temperatures of 200° F. or more. Preferably, low tack peel strengths of from 4 to 8 oz/in$^2$ will be obtained with 0.3% isocyanate resin on total acrylic solids. High tack peel strengths of from 8 to 20 are generally obtainable with 0.8 to 0.4% isocyanate resin on acrylic solids. The acrylic resin and isocyanate resin may be combined with a suitable organic solvent so as to achieve a spreadable or laminatable mixture which may be termed a dilute carrier adhesive. Preferably, sufficient toluene will be added so as to provide a dilute carrier adhesive having a % nonvolatile of from 30 to 70% and most preferably 50%.

The dilute carrier adhesive is applied to the plastic film 132 and sufficient heat is applied to drive off the solvent and initiate the crosslinking of the adhesive solution. Ideally, the plastic film with its coating of dilute carrier adhesive will be subjected to an environment having elevated temperatures for a period of time sufficient to drive off the organic solvent and initiate crosslinking. Exposure in ovens having temperatures of from 200° to 325° F. for periods of from 1 to 5 minutes have been found to be sufficient. Most preferably, temperatures of around 300° F. will be used for 2 to 3 minutes.

Enough dilute carrier adhesive will be applied to the plastic film 132 to provide a carrier adhesive 134 having a final or use thickness of from 0.5 to 5 mils. Those skilled in the art will appreciate that this amount will be dependent upon the % nonvolatile of the dilute adhesive solution. Most preferably, the carrier adhesive will have a final thickness of about 2 mils.

Turning now to FIG. 6, it can be seen how the carrier 130 of the present invention may be utilized in a laminated web for the production and application of graphics to be adhesively applied to an article. Laminated web 142 of FIG. 6 is comprised of carrier 130 and printed transfer 30. Carrier 130 is made of substantially transparent plastic film 132 and carrier adhesive 134 having a peel strength which reversibly decreases with increasing temperature.

Preferably, the adhesive layer 26 will be such that adherence of the printed transfer 30 to an article will occur upon the application of sufficient heat or pressure and most preferably upon application of a combination of both. Most preferably, the adhesive layer 26 will be activated, i.e., adhere to the article, when the combination of heat and pressure includes sufficient heat so as to lower the peel value of the carrier 130 for removal i.e., less than 1.0 oz/in$^2$.

However, it will be appreciated by those skilled in the art that the adherence of the printed transfer need not be contingent upon the application of heat. Adhesives activated only by pressure, such as pressure sensitive adhesives, are suitable for use as adhesive layer 26.

Figure 7:
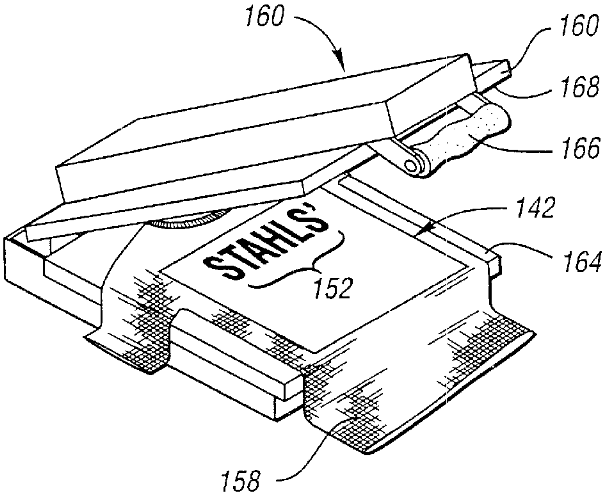
FIG. 7 is a perspective view of the laminated web of FIG. 6 being applied to a desired article.

FIG. 7 illustrates that application of the laminated web 142 to article 158. The laminated web 142 is positioned over the article 158 in such a manner that the transfer 30 will be positioned exactly as it will be ultimately adhered.

When the laminated web 142 is so positioned, the adhesive layer 26 will be in intimate contact with the article 158 and, where weeded portions were disposed, carrier adhesive 134 will be in intimate contact with article 158. In general, laminated web 142 will be juxtaposed or laid on top of article 158.

Article 158 may be any substrate to which it is desirable to adhere another material. Examples of illustrative articles are plastics, paper, fabric, and combinations thereof. It will be appreciated, however, that suitable substrates will be those which are not damaged by the heat which must be applied to provide for the immediate removal of carrier 130. Fabric articles are most preferred. Suitable fabric articles include natural fibers such as cotton and wool as well as synthetics such as polyester, rayon, etc.

FIG. 7 illustrates the use of heat sealing machine 160. Such a heat sealing machine is disclosed in U.S. Pat. No. 5,167,750, previously incorporated by reference. The heat sealing machine 160 will in general have an upper platen 162 and a lower platen 164. Upper platen 162 may be brought down so as to be parallel to lower platen 164 with the use of handle 166. In such a manner, it will be appreciated that the lower surface 168 of upper platen 162 will be in intimate contact with the first surface 138 of substantially transparent plastic film 132 of second carrier 130.

The upper platen 162 will be so positioned for a period of time sufficient to deliver enough heat or heat and pressure to adhere heat activated adhesive layer 26 to article 158. However, at a minimum, sufficient heat will be applied so that the carrier 130 reaches a temperature of 250° F. or more. Preferably heat in the range of from 200 to 350° F. and pressures of from 1 to 6. In general, adherence cycles of from 3 seconds to 30 seconds will be sufficient although times in the range of 1 or more minutes are possible. Most preferably, when using the heat machine 160, adherence cycles of 3 to 30 seconds will be used.

Figure 8:
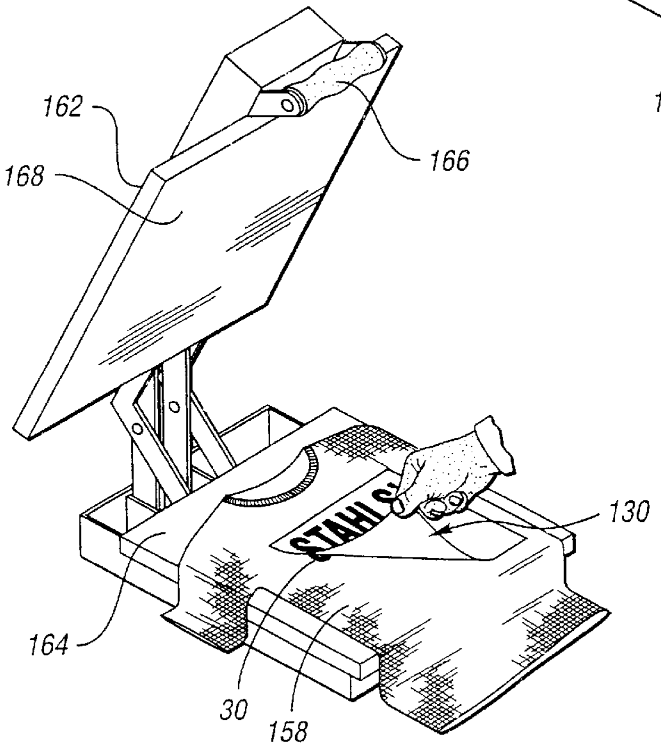
FIG. 8 is a perspective view of the laminated web of FIG. 6 being removed immediately after application of the printed transfer to the article.
Figure 9:
FIG. 9 illustrates an article after adhesion of the printed graphic.

At the completion of the adherence cycle, the carrier 130 is removed from article 158 as illustrated in FIG. 8 to reveal the graphic 12 adhered to the article 158 as shown in FIG. 9. The carrier 130 may be removed immediately from the transfer 30 while the peel strength of carrier adhesive 134 is less than 1.0 ounce per square inch. This presumes, however, that temperatures of 200° F. or more have been applied. It will be appreciated that with such peel strengths, the amount of upward force which must be applied to remove carrier 130 from the transfer 30 is essentially negligible. This is particularly advantageous since the still hot transfer 30 may be vulnerable to distortion and disruption from the forces normally required to remove prior art carriers. It will be appreciated that when carrier 130 cools back to room temperature, carrier adhesive 134 will regain its tack and 'stickiness' sufficient that the peel strength will be between 4 to 20 ounces per square inch and most preferably 5 to 10 ounces per square inch. Those skilled in the art will appreciate that this reversible characteristic of adhesive 134 allows for the reuse of carrier 130.

If the bond strength between adhesive layer 26 and the article 158 is greater than the bond between carrier adhesive 134 and transfer 30, the carrier 130 may be removed while at room temperature. In general, however, immediate removal of carrier 130 while the adhesive layer 134 is heated will be strongly preferred, since it reduces the application time required for each graphic.

Having now fully disclosed the invention, it will be apparent to one of ordinary skill in the art that many changes and modifications can be made thereto without departing from the spirit or scope of the invention as set forth herein.

Figure 10:
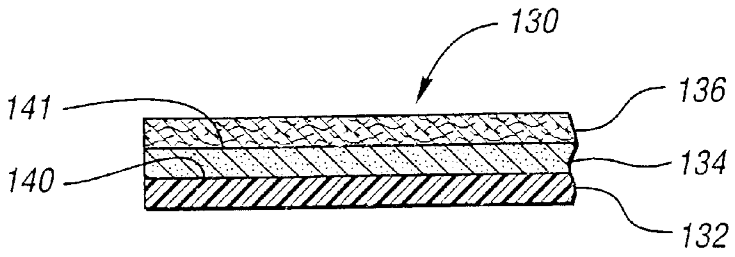
FIG. 10 illustrates the cross-sectional view in FIG. 5 of the second carrier further including an additional release sheet.

Although not required, most preferably, the carrier 130 will further comprise an optional release sheet 136 as shown in FIG. 10. Optional release sheet 136 will most preferably be comprised of a thin thermoplastic film or paper film having a surface 141 which lays upon and covers surface 140 of carrier adhesive 134. Examples of suitable thermoplastic release sheets are polyethylene, polyester, and polypropylene. High density polyethylene is most preferred. It will be appreciated that the composition of the optional release sheet is not critical and that a variety of materials will suffice. The objective of the release sheet 136 is to protect the carrier adhesive 134 from the deleterious effects of dust and dirt during transport. As indicated in FIG. 1, optional release sheet 136 may be peeled back to expose carrier adhesive 134. The carrier 130 covered with release sheet 136 may be cut into sheets or rolled to facilitate transport to the desired location of use. Alternatively, the carrier 130 may be rolled without the use of release sheet 136.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of adhering a transfer, the method comprising:

providing a heat sensitive polymer substrate having:

(i) a heat sensitive opaque polymer film having top and bottom surfaces;

(ii) a heat activated adhesive disposed upon one surface of the heat sensitive opaque polymer film; and (iii) a releasably coated carrier film which releasably carries the heat sensitive opaque polymer film with the heat activated adhesive disposed between the heat sensitive opaque polymer film and the releasably coated carrier film;

providing a second carrier film including a second polymer film having first and second opposite surfaces and a second adhesive having a peel strength which decreases with increasing temperature, wherein the second adhesive is disposed on the first surface of the second film;

printing resin solids in a desired graphic onto the top surface of the opaque polymer film, wherein the printing is at a temperature which is below the temperature at which the polymer substrate is activated and such that printing causes the resin solids to penetrate into the opaque polymer film to create a durable printed transfer;

positioning the printed transfer on the first surface of the second film; and adhering the printed transfer onto a thermally adherable article on which the graphic is to appear by applying sufficient heat to the polymer substrate at a temperature which is above the temperature which the polymer substrate activates so as to activate the polymer substrate and bond the polymer substrate to the article and at which to substantially reduce the peel strength of the second adhesive, and by applying sufficient force to adhere the graphic to the article.

2. The method of claim 1, wherein the opaque polymer film is selected from the group consisting of a polyurethane film and a PVC film.

3. The method of claim 1 further comprising the step of scoring the printed opaque polymer film and the heat activated adhesive in the desired graphic to facilitate separation of the printed transfer from the releasably coated carrier film.

4. The method of claim 1 wherein prior to the step of adhering, the opaque polymer film is kiss cut to form a transfer of desired graphic such that the depth of the kiss cut extends through the adhesive layer and the opaque polymer film, but not completely through the carrier.

5. The method of claim 1 wherein the article comprises a fabric selected from the group consisting of nylon, cotton, polyester, acetate, rayon, jute, wool and blends thereof.

6. The method of claim 1 wherein the resin solids comprise as a principal component, a polyolefin resin, the polyolefin resin selected from the group consisting of polyethylene resins; polypropylene resins; polybutylene resins; polypentene resins and copolymer resins of at least two of ethylene, propylene, butene and pentene.

7. The method of claim 1 wherein the heat activated adhesive comprises one or more heat activatable adhesives.

8. The method of claim 1 wherein the heat activatable adhesive is selected from the group consisting of hot melt thermoplastics and B-staged thermosets.

9. The method of claim 1 wherein the releasably coated carrier film comprises a coating containing a release agent selected from the group consisting of wax, silicon resin, and mixtures thereof.

10. The method of claim 1 wherein the releasably coated carrier film is selected from the group consisting of paper, mylar, polyester and PVC.

11. The method of claim 1 wherein the step of printing is achieved by a thermal printer having a ribbon comprising a heat-meltable ink layer.

12. The method of claim 11 wherein the thermal printer successively prints four different colors superimposed one on top of another.

13. The method of claim 12 wherein the thermal printer is a four pass printer capable of printing cyan, magenta, yellow and black.

14. The method of claim 1 further comprising removing the second carrier film from the adhered graphic and article.

15. The method of claim 1 wherein the second carrier film is substantially transparent and includes a polyester film and an adhesive having a peel strength which is between 4 to 20 ounces per square inch of width at room temperature and which is less than 1.0 ounce per square inch of width at temperatures in excess of 200° F.

16. The method of claim 1 wherein sufficient heat is applied so that the peel strength of the carrier adhesive is less than 1.0 ounces per square inch of width immediately prior to the removal of the carrier.

17. The method of claim 1 wherein adhering the printed transfer includes positioning the top surface of the opaque polymer film on the first surface of the second film so that both are in juxtaposed relation to the article.

18. The method of claim 1 further comprising applying sufficient force to adhere the graphic to the article.

19. The method of claims 1 further comprising removing the heat sensitive opaque polymer film and the heat activated adhesive from the releasably coated carrier film with the second carrier film.

20. A method for adhering a graphic to an article, the method comprising providing a substrate having a first film layer, a releasably coated layer, and a heat activated adhesive layer between and adhering to the first film layer and the releasably coated layer, the adherence of the heat activated adhesive layer being greater with the first film layer than with the releasably coated layer;

printing the graphic on the first film layer;

peeling the first film layer and the heat activated adhesive layer from the releasably coated layer, the first film layer and the heat activated adhesive layer forming a transfer;

providing a carrier film having a polymer film layer and a pressure sensitive adhesive layer, the pressure sensitive adhesive layer having an adherence strength which decreases with increasing temperature;

positioning the transfer on the carrier film and supplying sufficient pressure to adhere the pressure sensitive adhesive layer of the carrier film to the first film layer of the transfer, the transfer and the carrier film forming a web;

positioning the web on the article;

heating the article and the web sufficiently to cause the heat activated adhesive layer of the transfer to adhere to the article and the adherence strength of the pressure sensitive layer to decrease from the heating to a strength less than the adherence of the transfer to the article; and peeling the carrier film from the transfer to reveal the graphic and the transfer maintaining adherence to the article.

21. The method of claim 20 further comprising providing the carrier film with a release sheet for protecting the pressure sensitive adhesive layer of the carrier film from contamination and removing the release sheet from the carrier film prior to positioning the transfer on the carrier film.

22. The method of claim 20 wherein the adherence strength of the pressure sensitive adhesive is between 4 to 20 ounces per square inch of width at room temperature and decreases to at least 1.0 ounces per square inch of width during heating in excess of 200F.

* * * * *